(12) United States Patent
Condeixa et al.

(10) Patent No.: US 10,251,105 B2
(45) Date of Patent: Apr. 2, 2019

(54) DYNAMIC MOBILITY MANAGEMENT SYSTEM

(71) Applicants: Universidade de Aveiro, Aveiro (PT);
Instituto de Telecomunicações, Aveiro (PT)

(72) Inventors: Tiago Silvestre Condeixa, Vagos (PT);
Susana Barreto De Miranda Sargento, Il-havo (PT)

(73) Assignees: Universidade de Aveiro, Aveiro (PT);
Instituto de Telecomunicacoes, Aveiro (PT)

( * ) Notice: Subject to any disclaimer, the term of this patent is extended or adjusted under 35 U.S.C. 154(b) by 0 days.

(21) Appl. No.: 14/896,453

(22) PCT Filed: Jun. 9, 2014

(86) PCT No.: PCT/IB2014/062079
§ 371 (c)(1),
(2) Date: Dec. 7, 2015

(87) PCT Pub. No.: WO2014/195925
PCT Pub. Date: Dec. 11, 2014

(65) Prior Publication Data
US 2016/0127962 A1    May 5, 2016

(30) Foreign Application Priority Data

Jun. 7, 2013  (PT) .......................................... 106996

(51) Int. Cl.
*H04W 36/12* (2009.01)
*H04W 36/28* (2009.01)
(Continued)

(52) U.S. Cl.
CPC ........... *H04W 36/12* (2013.01); *H04W 8/087* (2013.01); *H04W 36/28* (2013.01); *H04W 76/19* (2018.02);
(Continued)

(58) Field of Classification Search
CPC ... H04W 36/12; H04W 36/28; H04W 76/028; H04W 80/04; H04W 36/0016; H04W 80/045; H04W 76/19; H04W 8/087
(Continued)

(56) References Cited

U.S. PATENT DOCUMENTS

2010/0150107 A1*  6/2010  Aghvami .......... H04W 36/0016
                                                    370/331
2011/0296027 A1* 12/2011  Salmela ............ H04L 29/12028
                                                    709/226

(Continued)

*Primary Examiner* — Faisal Choudhury
(74) *Attorney, Agent, or Firm* — Occhiuti & Rohlicek LLP

(57) ABSTRACT

The present document describes a dynamic mobility management system. The disclosure describes a mobility management mechanism that is able to maintain the IP address assigned when a session was initiated in the user device to exchange data packets between the end-points of a given data service. This is possible through the management of the distributed mobility anchors, tunnels, interfaces and IP addresses, where a mobile node is configured to bind to the previously accessed mobility access router, such that the previously established network sessions of the mobile node are re-established through said previously accessed mobility access router. The disclosure is applied in the Information and Communication Technology domain, more precisely in the mobility management in communication networks.

4 Claims, 3 Drawing Sheets

(51) Int. Cl.
  *H04W 76/19*  (2018.01)
  *H04W 80/04*  (2009.01)
  *H04W 8/08*   (2009.01)
  *H04W 36/00*  (2009.01)

(52) U.S. Cl.
  CPC ...... *H04W 80/045* (2013.01); *H04W 36/0016*
           (2013.01); *H04W 80/04* (2013.01)

(58) Field of Classification Search
  USPC .......................................................... 370/331
  See application file for complete search history.

(56) References Cited

U.S. PATENT DOCUMENTS

| | | | | |
|---|---|---|---|---|
| 2012/0106554 | A1* | 5/2012 | Ng | H04W 76/041 370/392 |
| 2013/0230021 | A1* | 9/2013 | Zuniga | H04W 8/087 370/331 |
| 2014/0321328 | A1* | 10/2014 | Zuniga | H04W 8/06 370/254 |
| 2015/0078359 | A1* | 3/2015 | Scahill | H04W 48/16 370/338 |
| 2016/0007191 | A1* | 1/2016 | Perras | H04L 61/1511 370/328 |

* cited by examiner

DYNAMIC MOBILITY MANAGEMENT SYSTEM

CROSS REFERENCE TO RELATED APPLICATION

This application is the national phase under 35 USC 371 of international application no. PCT/IB2014/062079, filed Jun. 9, 2014, which claims the benefit of the priority date of Portuguese application no. 106996, filed Jun. 7, 2013. The contents of the aforementioned applications are incorporated herein in their entirety.

TECHNICAL FIELD

The present document describes a dynamic mobility management system. The disclosure is applied in the Information and Communication Technology domain, more precisely in the mobility management in communication networks.

BACKGROUND ART

Current mobility management solutions are based on heavy centralized models, in which a single static element does the management of the data and control of a high number of users. This element has to manage the mobility context of all users of that network, as well as to forward all data traffic of the network. This model brings several problems regarding scalability (e.g. bottlenecks and single point of failure), security (e.g. single point of attack), and performance (e.g. non optimized and centralized routing). There is a novel trend to distribute the mobility management functionalities, where an Internet Task Force (IETF) working group was charted, which intends to clearly understand the problem statement and develop novel solutions. This IETF working group, called "Distributed Mobility Management" has been proposing novel distributed mobility solutions, which introduce the concepts of dynamic mobility and anchoring. These solutions just provide mobility support when data traffic sessions really need them, and define that current ongoing sessions are maintained active through the routers where they were initiated (mobility anchors), while new sessions are established through the current access router of the user. Besides the introduced improvements, the novel solutions are just partially distributed, where the traffic sessions are anchored in the access routers, and maintained through tunnels between them. However, the mobility control plane remains centralized, such as the management of the bindings between IP addresses of the user. The entire mobility control context is maintained in a centralized server that has to be updated and accessed whenever is necessary to create/update or delete any mobility context information. The solutions known as the technique background do not provide any mechanism to cope with scenarios where the access router of the user does not provide any mobility functionality. Moreover, the novel distributed mobility management solutions do not specify any support for a unified mobility management for multihomed devices (e.g. user device with several interfaces), nor any mechanisms to maintain the user sessions for handovers between interfaces. These scenarios are quite relevant since the user may loss the connectivity in one of its interfaces, but he can maintain the sessions active through the other interfaces, as well as to redirect traffic sessions in network congestion or data offloading scenarios.

SUMMARY OF THE DISCLOSURE

The disclosure describes a mobility management mechanism that is able to maintain the IP address assigned when a session was initiated in the user device to exchange data packets between the end-points of a given data service.

This is possible through the management of the distributed mobility anchors, tunnels, interfaces and IP addresses.

As a preferential embodiment, the proposed approach distributes the bindings between IP addresses through the mobile devices, where each device manages its mobility anchors and respective IP addresses.

As another preferential embodiment, the proposed mechanisms is able to manage IP tunnels between the mobile node and its mobility anchors, even when the current access router does not provide any mobility support.

As another preferential embodiment, the proposed mechanism is able to detect if the access router provides mobility support or not, and from this information it manages the IP tunnels that provide the data traffic forwarding, where one of the end-points is the mobility anchor, and the other end-point can be the own mobile node or its current access router, according to the mobility support indication given from its current access router.

As a preferential embodiment, the mobile node managed by the mechanisms has information about the ongoing traffic sessions and respective mobility anchors.

As another preferential embodiment, the mechanism present the possibility to configure IP routing/forwarding rules in the access router, which define that the packets destined to a given IP address should have the other interface of the mobile node as the next hop, as well as is able to move the IP addresses between these interfaces.

As another preferential embodiment, the proposed mechanism is able to manage tunnels, routes, mobility anchors and IP addresses, even after a disruption in one of the mobile node interface.

It is disclosed a mobility management system for an IP-protocol data communication network for handling distributed mobility anchor network nodes with IP addresses,
  said system comprising said mobility anchor nodes, interfaces and tunnels;
  said system comprising bindings from said anchor nodes to the IP address of a network mobile node,
  wherein the mobile node handles the mobility anchors, and respective IP addresses, to which it is bound, irrespective of the current access router of the mobile node providing, or not, said mobility management,
  wherein said mobile node is configured to:
  detect whether the current network access router of the mobile node provides said mobility management, herewith designated as a mobility access router, and
  if the current access router of the mobile node is a mobility access router, the mobile node is configured to bind to the current mobility access router, such that the previously established network sessions of the mobile node are re-established through both the previously accessed mobility access router and the current mobility access router, or
  if the current access router of the mobile node is not a mobility access router, the mobile node is configured to bind to the previously accessed mobility access router, such that the previously established network sessions of the mobile node are re-established through said previously accessed mobility access router.

In a preferred embodiment, the bindings are IP tunnels, VPNs, VLANs, or by IP packet encapsulation.

In another preferred embodiment, said mobile node is configured to:
  if the current access router of the mobile node is a mobility access router, the mobile node is configured to bind to the current mobility access router by defining as deprecated the IP address of the previously accessed mobility access router and by defining as preferred the IP address of the current mobility access router, or if the current access router of the mobile node is not a mobility access router, the mobile node is configured to bind to the previously accessed mobility access router, by defining as deprecated the IP address of the current access router and by defining as preferred the IP address of the previously accessed mobility access router.

It is disclosed a mobility management system for an IP-protocol data communication network for handling distributed mobility anchor network nodes with IP addresses, said system comprising said mobility anchor nodes, interfaces and tunnels;

said system comprising bindings from said anchor nodes to the IP address of a network mobile node, wherein the mobile node handles the mobility anchors, and respective IP addresses, to which it is bound, irrespective of the current access router of the mobile node providing, or not, said mobility management, wherein said mobile node is configured to detect disruption of the mobile node network interfaces to the network access routers which provide said mobility management, herewith designated as a mobility access routers, and if disruption is detected, the mobile node and mobility access routers are configured such that the previously established network sessions through the disrupted mobile node network interface or interfaces are re-established through the undisrupted mobile node network interface or interfaces by a binding between the disrupted mobility access routers and the undisrupted mobility access routers.

In a preferred embodiment, the bindings are IP tunnels, VPNs, VLANs, or by IP packet encapsulation.

In another preferred embodiment, wherein said mobile node is configured to:

if disruption is detected, the mobile node is configured to define as deprecated the IP address of the disrupted mobile node network interface or interfaces and to define as preferred the IP address of the undisrupted mobile node network interface or interfaces.

The mobility management, initially defined in cellular networks, provides the reachability for new and ongoing traffic sessions of the user, while it moves between different access networks. However, current solutions are based on heavy centralized models, where a single and static entity is responsible to provide all mobility management functionalities to a huge number of users. This entity, called mobility anchor, has to manage both data and control planes of mobility management.

The main purpose of this novel technique is the optimization of the mobility management, in order to improve its performance, scalability and security. The technique ensures session continuity of traffic through a fully distributed and dynamic mobility management, distributing mobility anchors through the network elements, as well as some mobility functionalities through the user devices, always taking into account the available interfaces in the user device. Both the current network elements and user devices can properly work with the proposed approach, since it just requires a software update procedure. The proposed technique is also useful, since it allow us to completely remove any centralized element for mobility management purposes, and consequently being able to optimize the resources of the network and the connected devices.

The disclosure relies on the distribution of the traffic anchoring by the access routers of the networks, where it uses tunnels to forward traffic sessions when the user changes of access network. The proposed solution is also based on dynamic mobility and dynamic anchoring concepts, which was recently defined. However, the technique goes further with the introduction of a full distribution of the mobility management functionalities through the access routers and user devices. The control plane is mainly distributed through the user devices, being each one responsible to maintain its set of mobility anchors and IP addresses. Hence, the mobility context is fully distributed through the network, and when a user changes of network it can immediately provide its updated information to the current access router, if it provides mobility support. If the current access router does not provide mobility support, the proposed technique is also able to provide mobility support to the user in order to ensure session continuity of its ongoing sessions, since the user device is capable to establish IP tunnels between itself and its set of mobility anchors, i.e. access routers. This mobility support, independent from the mobility support of the access router, allows that the user be able to experience global mobility support in heterogeneous networks, independently of the access technology and the Internet access provider.

The technique is also able to solve the problematic of session continuity between the mobile node interfaces in the distributed mobility management systems. Due to the management provided by the mobile node, regarding mobility anchors, interfaces, tunnels and IP addresses, the technique is able to ensure session continuity of the user required services, while it is improved the management of the network and user device resources, as well as a better response to disruptions/failures in the network or in the mobile node interfaces. The technique also includes mechanisms to provide session continuity between interfaces connected to the same access router, in the same or different networks, through the configuration of the routing/forwarding rules in the access router and the switch of IP addresses between interfaces, without the introduction of new tunnels.

BRIEF DESCRIPTION OF THE DRAWINGS

The following figures provide preferred embodiments for illustrating the description and should not be seen as limiting the scope of the disclosure.

DETAILED DESCRIPTION

Figure 1:
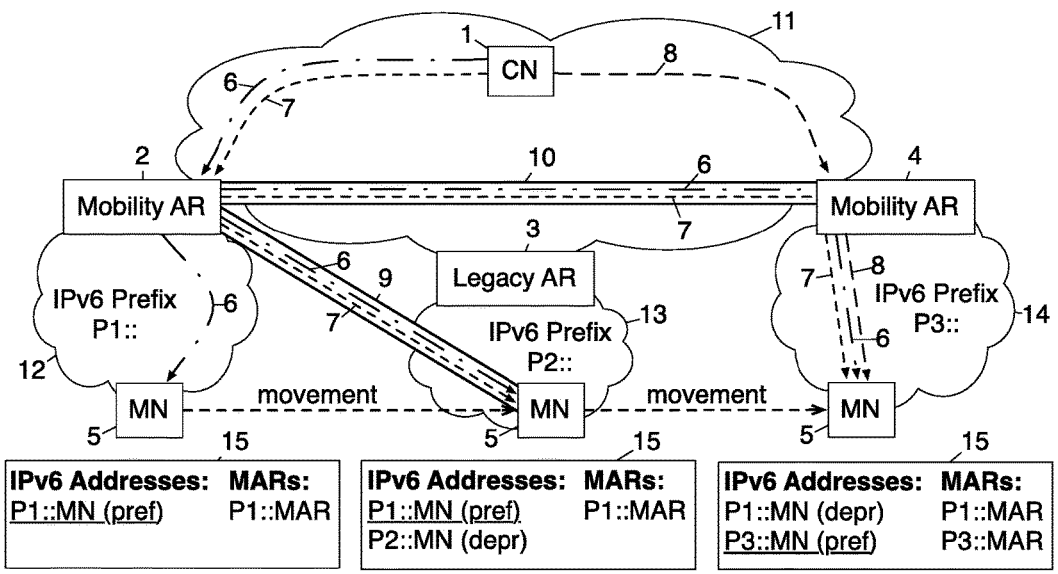
FIG. 1 shows an example of the technique for a device with a single interface, in order to illustrate some fundamental principles of the disclosure, including a correspondent node 1, for example a university location mobility access router 2 according to the disclosure, a coffee shop location with a legacy access router 3 and a home location with a mobility access router 4 according to the disclosure, a mobile node 5 according to the disclosure, a $1^{st}$ session 6, a $2^{nd}$ session 7, a $3^{rd}$ session 8, IPv6 tunnels 9 and 10, networks 11, 12, 13 and 14 respectively of the correspondent node 1, university location access router 2, a coffee shop legacy access router 3 and home location mobility access router 4, respective network status 15 of the mobile node 5 at the mentioned locations.

In order to describe the presented technique it will be mentioned the appended figures, which do not intend to limit the scope of this invention. In FIG. 1, the session 1, initiated in the University, is established without any mobility support through the University access router that provides mobility support. When the mobile device moves to the Café, it verifies that the Café access router does not provide mobility support, thus, to maintain the ongoing session 1, the mobile node has to establish a tunnel with the University access router to forward the session 1 traffic. In this case, it will be established as many tunnels as the number of user that initiated their sessions in the University and then move to the Café. The IP address received in the University (P1::MN/64) remains the preferred one for new sessions, since the Café access router does not provide mobility support. The tunnel is associated with an IP address, and it will be created as the user connects to the Café network. Then, new sessions when the user is in the Café use the same tunnel already established. A true or false mobility support indicator the device identifies if a router provides or not mobility support. Based on this indication, the presented technique selects the procedure to be activated. For sessions requiring continuity support, the proposed technique just selects the routers with mobility support. When the mobile node initiates the session 2, while it is in the Café, it has to be established from the beginning through the tunnel already created with the University access router. The University access router is the only one capable of anchoring sessions and forwarding them when the mobile node moves again to another network. When the mobile node moves again, to Home network, it verifies that the access router from the Home network provides mobility support. The mobile node provides its mobility context to the Home access, such as the IP address of the University access router (P1::MR/64), the IP address assigned there (P1::MN/64), and its new IP address obtain from Home network. The Home access router establishes a tunnel with the University access router, in order to maintain sessions 1 and 2 through the tunnel. The new IP address received from the Home network is the preferred one, since the Home access router provides mobility support, and the other IP addresses are maintained in the deprecated mode just to maintain the previous sessions. When the mobile node initiates the new session 3 at Home, it is established without any mobility support through the IP address obtained from Home network (P3::MN/64).

Figure 2A:
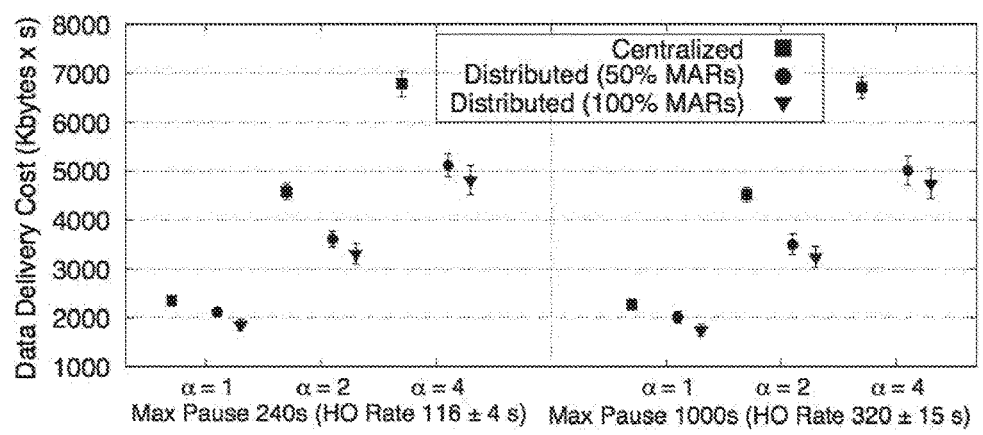
FIGS. 2 *a*) and *b*) illustrate the results obtained from the presented technique through simulations executed in the "network simulator 3". While FIG. 2 *a*) presents the evaluation of the data delivery cost, FIG. 2 b) introduces the evaluation regarding the cost needed to signaling the control messages.
Figure 2B:
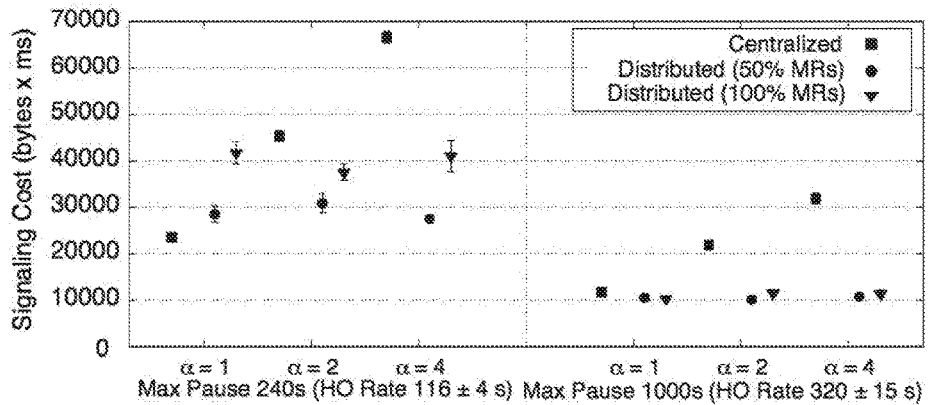

FIG. 2 presents the evaluated metrics, such as the data delivery cost, where the data packets size is multiplied by the time that the packets need to be transmitted through the network; and the signaling cost that multiplies the control message size by the time the messages remain in the network to be delivered to the destination. The Alfa variable represents the relation of the number of IP hops between: 1) HA/CN and an access router, and 2) among access routers. From the outcome, the proposed technique reduces the data delivery cost and the signaling cost when compared with the centralized solution. In the evaluation, it was tested the technique in a scenario where all access router provide mobility support, and another scenario where just half of the access router provide mobility support. Even for the scenario with half of the access router with mobility support, the proposed technique significantly improves the mobility management; point out the technique as a promising trend for distributed mobility management.

Figure 3:
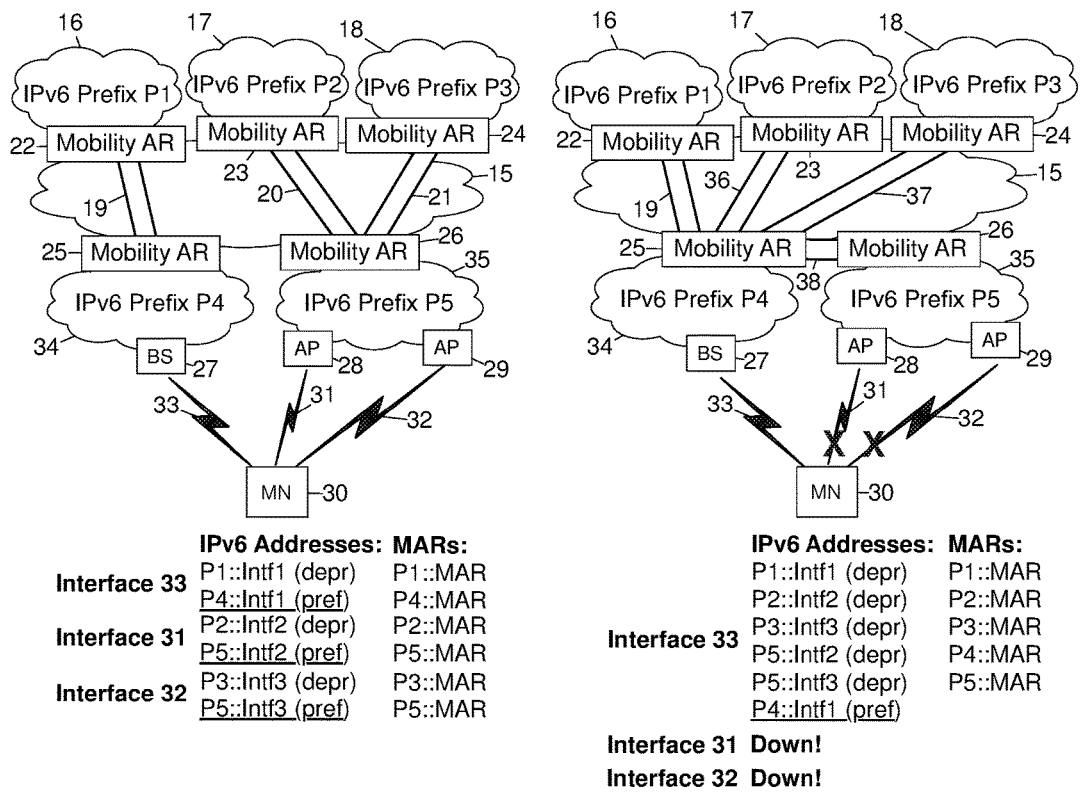
FIG. 3 illustrates the technique for a device with multiple interfaces, including mobility access routers 22, 23, 24, 25 and 26, networks 34, 35, 15, 16, 17, and 18, IPv6 tunnels 19, 20, 21, 22 and 23, base station 27, access points 28 and 29, mobile node 30, and interfaces 32, 31 and 33.
Figure 4:
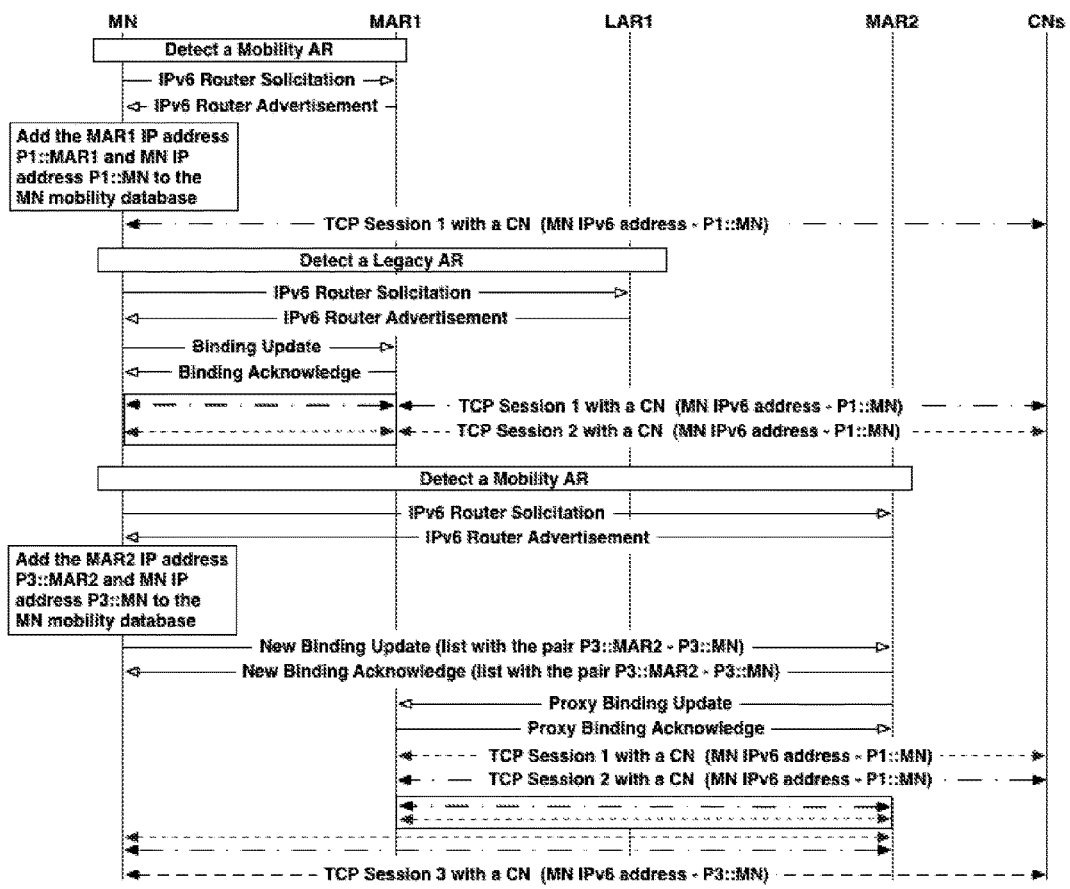
FIG. 4 illustrates an example of a message diagram and the respective interactions of the technique in the scenario presented in FIG. 1.

After the explanation of the technique for a user device with a single interface, FIG. 3 introduces examples of multiple interfaces (31, 32 and 33), through the illustration of specific scenarios. As shown in FIG. 3, the mobile node manages the IP tunnels (19, 20, 21, 36, 37 and 38) between access routers (22, 23, 24, 25 and 26), the IP address and mobility anchors, in order to ensure traffic sessions continuity. As can be seen by the right image, if there is a disruption or failure in interfaces 32 and 32 of the mobile node 30, the technique is capable to maintain the ongoing sessions anchored in other access routers, through the establishment/update of the tunnels (20, 21, 36, 37 and 38), where all have to be maintained with the access router 25 of interface 33. Moreover, the IP addresses that were configured in interfaces 31 and 32, and are associated with mobility anchors (23, 24, 26), need to be changed to interface 33 to ensure that packets are not rejected. When connectivity is reestablished in interfaces 31 and 32, part of the tunnels (20 and 21) can be change to the access routers of theses interfaces. In the example, if a disruption just happens in interface 31, there is no need to move the tunnels 20 and 21, since it enough to create a rule in mobility access router 26 with the network prefix P5 to forward all the data traffic with the IP address of interface 31 to the IP address of interface 32, as well as to change the IP address from interface 31 to interface 32.

Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the invention as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

Telecommunication operators can apply the presented technique to ensure a better management of their network resources. The technique allows that the telecommunication operators realize the traffic offloading from their 3G/4G networks through any other network where the user is connected, including networks from other operators or from users/entities. The technique is able to offload the traffic through 3G/4G, while maintains the continuity of the sessions required by the user. The technique allows that the user uses its usually work or home WiFi networks, and when the user get out of these usual places, it is activated the mobility support, and its ongoing (e.g. video or file download) are maintained through the 3G/4G interface.

Another case covered by the technique is the maintenance of sessions anchored in users previous access routers through different interfaces, such as a video streaming that can be maintained through the WiFi interface, while a web page or email can be maintained through the 3G/4G interface. In these cases, we can use two connections at the same time, splitting the services through the two interfaces or start a new connection and move the traffic sessions to the new connection before lose the previous one. Another hypothesis can be also considered.

In scenarios with a single interface device, there is a small period of a few seconds (e.g. 2 to 3 seconds), in which is not possible to receive the services, since there is a disconnection and a new connection, but it is assured the session continuity with a small disruption/delay.

The technique provides the adequate means for a management, according to the operator, which is following the trend of using the WiFi resources ever as possible, since the user remains with the same quality of experience.

The presented embodiments are not restricted to the examples described in this document, and a person with an average knowledge in the scope of the area can realize several adaptations of the technique without departing from the original disclosure as defined in the appended claims.

The described embodiments can be combined. The following claims define additional embodiments of the disclosure.

The invention claimed is:

1. A mobility management system for an IP-protocol data communication network, comprising:
a plurality of mobility anchor nodes coupled to a first part of the IP-protocol data network, each anchor node providing communication paths from a part of the IP-protocol data network associated with said anchor node and the first part of the IP-protocol network;
a first mobile node configured to maintain network sessions when moving between the parts of the IP-protocol data network, with a corresponding mobility anchor node of each of said parts providing communication paths to nodes coupled to the first part of the IP-protocol data network;
wherein some but not all of the mobility anchor nodes are configured according to a mobility management approach for managing movement of the first mobile node among parts of the IP-protocol network associated any of the mobility anchor nodes, the mobility anchor nodes so configured herewith designated mobility access routers;
wherein said first mobile node is configured to
detect whether a first mobility anchor node providing communication paths between the first mobile node and the first part of the IP-protocol data network is a mobility access router, and
if said first mobility anchor node is a first mobility access router, cause the first mobility access router to form a first network binding between the first mobility access router and a second mobility access router previously accessed by the first mobile node, such that previously established network sessions of the first mobile node are passed through said first network binding and are established through both the second mobility access router and the first mobility access router, and
if said first mobility anchor node is not a mobility access router, form a second network binding between the first mobile node and the second mobility access router, such that the previously established network sessions of the first mobile node are passed through said second network binding and are established through the second mobility access router.

2. The mobility management system of claim 1, wherein the bindings include one or more of IP tunnels, VPNs, VLANs, and IP packet encapsulation.

3. The mobility management system of claim 1 wherein said first mobile node is configured to:
if the first mobility anchor node is a mobility access router, the first mobile node is configured to bind to the first mobility anchor node by defining as deprecated an IP address of the second mobility access router and by defining as preferred an IP address of the first mobility anchor node, or if the first mobility anchor node is not a mobility access router, the first mobile node is configured to bind to the second mobility access router, by defining as deprecated the IP address of the first mobility anchor node and by defining as preferred the IP address of second mobility access router.

4. The mobility management system of claim 1 wherein the mobility management system includes management of an IP-protocol data communication network for handling distributed mobility anchor nodes with IP addresses.

* * * * *